M. TIPS.
OBTURATOR.
APPLICATION FILED MAR. 6, 1917.
1,306,034.  Patented June 10, 1919.
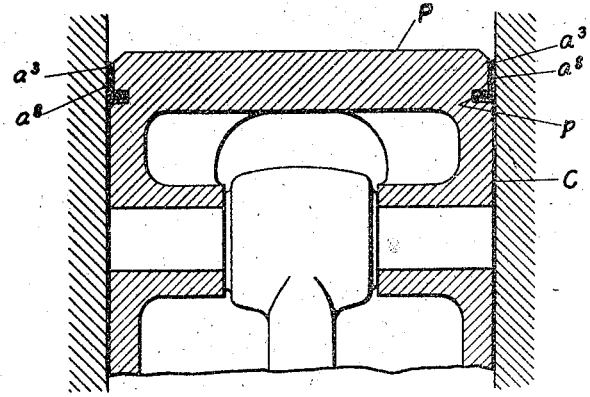
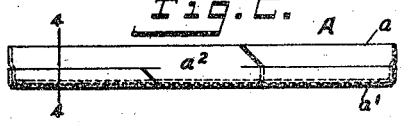
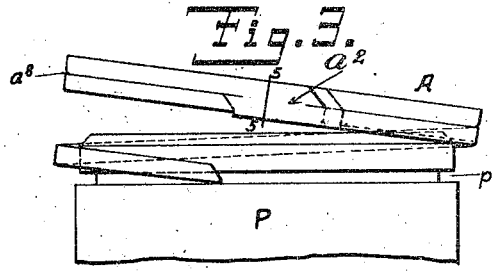
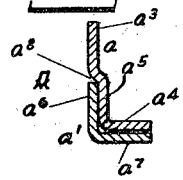   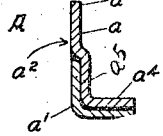

UNITED STATES PATENT OFFICE.

MAURICE TIPS, OF WOONSOCKET, RHODE ISLAND.

OBTURATOR.

1,306,034.

Specification of Letters Patent.    Patented June 10, 1919.

Application filed March 6, 1917. Serial No. 152,568.

*To all whom it may concern:*

Be it known that I, MAURICE TIPS, a subject of the King of the Belgians, residing in Woonsocket, in the county of Providence and State of Rhode Island, have invented certain new and useful Improvements in Obturators, of which the following is a specification.

My invention relates to obturators, and particularly to an obturator for use in connection with a piston of an engine. It has for an object to close the space between the walls of the piston and cylinder so as to obtain the maximum effect of the pressure in the cylinder to move the piston therein. An obturator embodying my invention is particularly adapted for use in combustion engines of either the rotary or stationary type. A type of rotary engine in which my present invention is applicable is shown in my United States Patent No. 1,051,290, issued on January 21st, 1913.

I will describe an obturator embodying my invention and then point out the novel feature thereof in claims.

In the accompanying drawings Figure 1 is a detail sectional view of a part of a piston, a cylinder in which it moves, and an obturator carried by the piston and embodying my invention. Fig. 2 is a view in elevation of an obturator embodying my invention. Fig. 3 is a detail view showing the manner of applying an obturator embodying my invention to a piston. Figs. 4 and 5 are cross-sectional views of the obturator shown in Figs. 1 to 3, inclusive, on an enlarged scale, and taken on the lines 4—4 of Fig. 2 and 5—5 of Fig. 3.

Similar letters of reference designate corresponding parts in all of the figures.

Referring now more particularly to Fig. 2, my obturator A comprises one or more members which are expanded by the pressure in the cylinder to close the space between the walls of the cylinder and piston, thereby providing a mechanical packing between said walls, and which members, when compressed, will cause a ring of the lubricating fluid in the cylinder to form between the said walls and thus provide a fluid packing between said walls. The specific form of obturator shown comprises two split resilient metal rings $a$, $a'$, which are superimposed and are joined together to form an enlarged portion as shown at $a^2$. I prefer to join these two rings by imposing an end of the ring $a$ upon an end of the ring $a'$ whereupon these ends may be welded together thereby forming one continuous ring as clearly shown in Fig. 3. I wish it understood, however, that the obturator A may be formed from one continuous piece of metal should it be so desired, thus eliminating the welding process in the manufacture of the device. The upper ring $a$ has a cross-section like that illustrated in Fig. 4 and comprises two flanges $a^3$, and $a^4$ at right angles, and an offset portion $a^5$. The lower ring $a'$ has a cross-section like that illustrated in Fig. 4 and comprises two flanges $a^6$ and $a^7$ at right angles. The two flanges $a^4$ and $a^7$ are superimposed, and the flange $a^6$ engages the offset portion $a^5$ of the ring $a$ so that the outer surface of the flanges $a^3$ and $a^6$ lie in the same plane. It will be noted also because of the peculiar disposition of the flange $a^3$, the offset portion $a^5$, and the flange $a^6$, that a groove $a^8$ is formed between the flange $a^3$ and the end of the flange $a^6$, which groove extends around the obturator from one end of the enlarged portion $a^2$ to the opposite end thereof.

Referring now to Fig. 1, C designates a portion of a cylinder of an engine in which pressure in some form is produced to cause a movement therein of a piston P. $p$ designates an annular groove provided in the piston to receive the flange of the obturator so that it will be held in place in the piston. Fig. 3 illustrates a way of applying the obturator to the piston, which is to distend it to a spiral and then thread it into the annular groove $p$.

It will be noted from Fig. 1 that the flange $a^3$ of the ring $a$ is clear of the piston so that it will be subjected by the pressure in the cylinder to cause the ring $a$, as well as the ring $a'$, through the portion $a^2$, to expand circumferentially and thereby to close the space between the piston and the cylinder, and thus provide a tight packing at that point. The pressure in the cylinder also acts to seat the two rings one upon the other and upon the bottom of the annular groove $p$ so that the lubricating oil which may have found its way between the rings $a$, $a'$ will be forced out into the annular groove $a^8$, thereby providing a fluid seal between the walls of the cylinder and piston.

Having thus described my invention, what I claim as new is:—

1. An obturator comprising a split ring having a flange and an offset portion, said flange bearing a perpendicular relation to said offset portion, a second split ring comprising a pair of flanges, one of which receives thereupon the flange of the first named ring, the other flange of the second named ring being in engagement with said offset portion whereupon the expansion of the first named ring will cause an expansion of the second named ring.

2. An obturator comprising a pair of split rings, one of said rings comprising a pair of flanges, and an offset portion connecting the two flanges, one of said flanges bearing a parallel relation to said offset portion, the other of said flanges bearing a perpendicular relation to said offset portion, the other of said rings comprising a pair of angularly disposed flanges, one of the latter named flanges receiving thereupon said perpendicularly arranged flange, the other of the latter named flanges having peripheral engagement with the offset portion.

3. An obturator comprising a pair of split rings, one of said rings comprising an offset portion, a flange arranged perpendicularly to said offset portion, said flange being carried by said offset portion, and a second flange carried by the offset portion, the second named flange being arranged parallel to said offset portion, the other of said rings comprising a pair of flanges one of which receives thereupon said perpendicularly arranged flange, the other flange of said pair having peripheral engagement with the offset portion and arranged beneath said parallel flange to form with said parallel flange a groove.

4. An obturator comprising a pair of split rings, one of said rings comprising an offset portion, a flange arranged perpendicularly to said offset portion, said flange being carried by said offset portion, and a second flange carried by the offset portion, the second named flange being arranged parallel to said offset portion, the other of said rings comprising a pair of flanges one of which receives thereupon said perpendicularly arranged flange, the other flange of said pair having peripheral engagement with the offset portion and arranged beneath said parallel flange to form with said parallel flange a groove, said groove extending substantially throughout the length of said rings.

In testimony whereof I have hereunto signed my name in the presence of the subscribing witnesses.

MAURICE TIPS.

Witnesses:
LOUIS M. BOZINET,
SILAS PRUE, Jr.